United States Patent Office 2,782,721
Patented Feb. 26, 1957

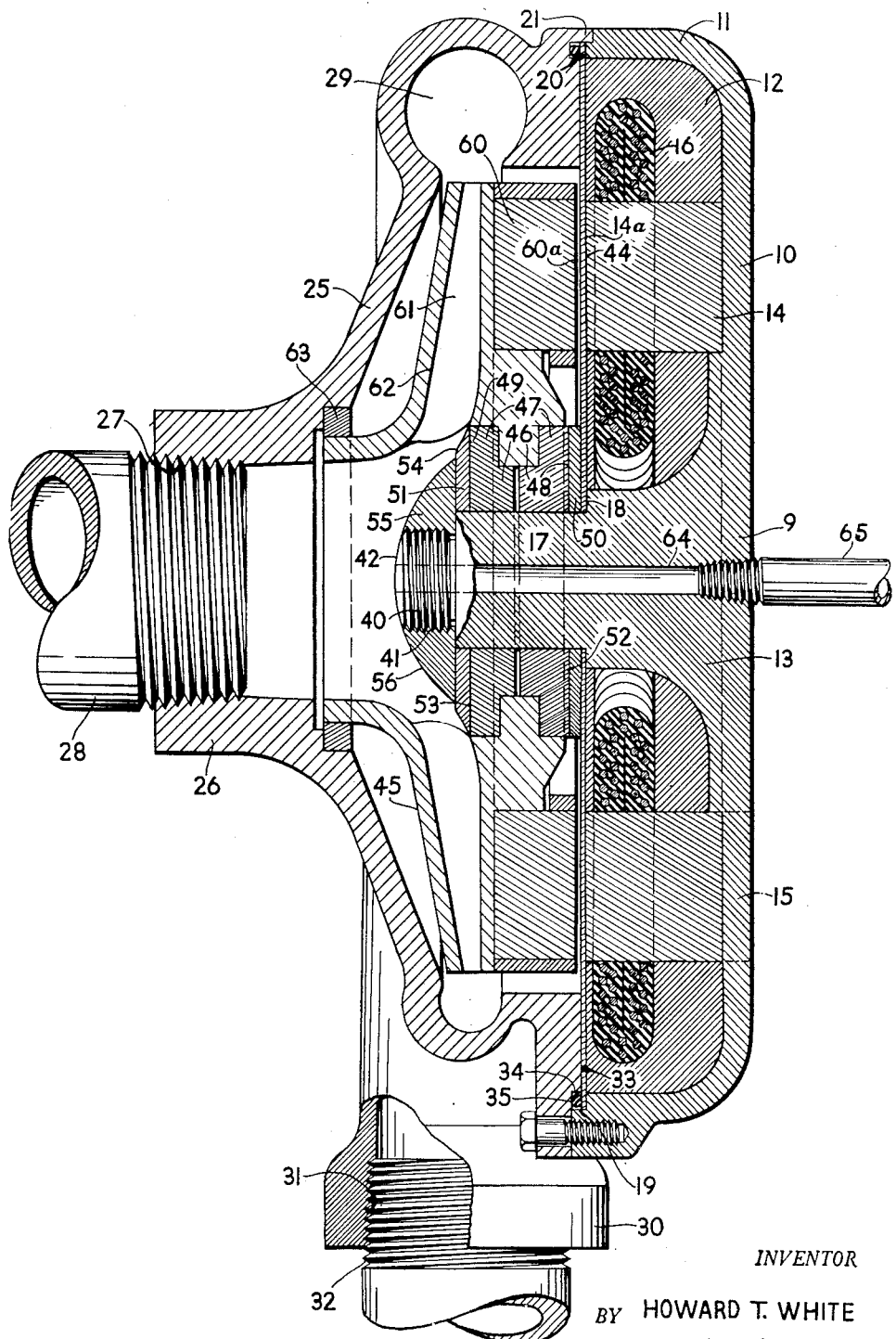

2,782,721

MOTOR DRIVEN PUMPS

Howard T. White, Philadelphia, Pa.

Application August 19, 1949, Serial No. 111,106

9 Claims. (Cl. 103—87)

This invention relates to motor driven pumps.

It is the principal object of the present invention to provide a motor driven pump which is simple in construction and effective in operation.

It is a further object of the present invention to provide a motor driven pump in which the size of the pump rotor or impeller is not limited by the size of the motor.

It is a further object of the present invention to provide a motor driven pump in which an improved rotor combining the functions of a motor armature and pump impeller is employed and in which the separation between the rotor and the motor stator is effected in an improved manner.

It is a further object of the present invention to provide a motor driven pump which does not have any projecting shaft or other moving parts, does not require glands, stuffing boxes and the like, in which the motor stator can be hermetically sealed, in which a single moving element is employed, and in which the bearings do not require lubrication.

It is a further object of the present invention to provide a motor driven pump which may be operated in any desired position, i. e. with the axis of the impeller horizontal, vertical, or inclined.

It is a further object of the present invention to provide a motor driven pump in which the axial thrust of the impeller and the axial thrust of the motor are opposed.

It is a further object of the present invention to provide a motor driven pump which may be employed, if desired, for fluid mixing.

It is a further object of the present invention to provide a motor driven pump which will be quiet in its operation and free from likelihood of radio interference.

Other objects and advantageous features of the invention will be apparent from the specification and claims.

The nature and characteristic features of the invention will be more readily understood from the following description, taken in connection with the accompanying drawing forming part hereof, in which:

The figure is a longitudinal central sectional view of a motor driven pump in accordance with the present invention, parts being shown in elevation.

It should, of course, be understood that the description and drawing herein are illustrative merely, and that various modifications and changes may be made in the structure disclosed without departing from the spirit of the invention.

Referring now more particularly to the drawing in which a preferred embodiment of the invention is illustrated the motor operated pump therein shown includes, as part of a stationary housing, a motor stator casing section 9, preferably made as a unitary casting, having a radially extending plate portion 10 with an axial flange 11 at the outer portion thereof and a hub 13 at the central portion thereof. The space 12 between the hub 13 and the flange 11 provides an annular stator chamber and has mounted therein the stator 14 of an axial air gap electric motor of the induction type, slots 15 being provided in the plate portion 10 for welding the stator 14 in position. The stator 14 for a motor of this type has a radial annular stator face 14a. The stator 14 has stator windings 16, which are insulated in any desired manner. The space 12 within which the stator 14 is disposed may, if desired, and after the insertion of the stator 14, be filled with any desired insulating and water-proofing filling material, particularly if the pump is to be completely immersed or submerged.

The hub 13 has a portion 17 of reduced diameter to provide a shoulder 18. The flange 11 has a channel 19 to provide an end face 20 alined with the shoulder 18 from the outer end of which a rim 21 extends.

An impeller or motor casing section 25 is provided, also as part of the stationary housing and in juxtaposed axial alignment with the section 9, preferably made as a unitary casting, having a central axial fluid inlet or intake connection 26 at the portion thereof remote from the motor stator casing 9. The inlet connection 26 may be internally threaded, as at 27 if desired, for the attachment of a fluid inlet pipe 28.

The impeller casing 25 is preferably provided with a scroll 29 having an outlet or discharge connection 30, which may, if desired, be internally threaded as at 31 for the attachment of a fluid delivery pipe 32. The casing 25 has an end face 33, the outer extremity of which is provided with an annular groove 34 into which the rim 21 extends. Within the annular groove 34 and enclosed by the rim 21, a sealing ring 35 is provided, the ring 35 preferably being of the type known as an O ring.

The hub 13, extending inwardly from the portion 17 has an end portion 40, externally threaded as at 41 and with a rounded terminal portion 42.

Interposed between the motor stator casing 9 and the impeller casing 25, a separator plate or diaphragm 44 is provided, in engagement with the end face 20 and the shoulder 18 and with the sealing ring 35 in sealing engagement therewith. The separator plate 44 may be made of any desired non-magnetic responsive material, and either metallic or synthetic plastic, although it is preferred to employ stainless steel which has the desired strength and non-magnetic responsive characteristics, and is also resistant to water and many other liquids.

An impelller 45 is provided, rotatably mounted on the hub portion 17. The impeller 45 has a pair of oppositely disposed bearing rings 46, preferably of graphite or other self-lubricating material, mounted thereon, the rings 46 having flanges 47 and side faces 48 and 49 for engagement with bearing and thrust plates 50 and 51. The bearing plate 50 has a radially extending face 52 in engagement with the side face 48 and is in engagement with the plate 44, and the bearing plate 51 has a radially extending face 53 in engagement with the side face 49, and a curved exterior face 54. A nut 55, in engagement with the threaded end 40 holds the impeller in position for rotation. The outer face 56 of the nut 55 is preferably curved for aiding in guiding the fluid to the impeller vanes.

The impeller 45 has a motor rotor 60 mounted thereon, in facing relation to the motor stator 14 and separated therefrom by the plate 44. The rotor 60 may be of any suitable construction for use in axial air gap motors and has a radially disposed annular face 60a on which the inductive effect from the rotating field in the stator 14 is available at the stator face 14a.

The impeller 45 may have any preferred type of impeller vanes 61, with a shroud 62, if desired, and if a shroud 62 is employed a seal ring 63 may be provided between the impeller 45 and the impeller casing 25.

If the pump is to be employed for mixing, the motor stator casing 9 may be provided with an axial passageway 64 extending through the hub portions 17 and 40 for the delivery of fluid to be added. The passageway 64 preferably has a fluid delivery pipe 65 connected thereto.

The mode of operation will be, it is thought, apparent from the foregoing but may be summarized briefly as follows:

With electric energy supplied to the windings 16 of the stator 14, rotation of the impeller 45 is effected by the force applied on the rotor 60.

Fluid is supplied through the fluid inlet connection 26 to the impeller vanes 61 and delivered thereby to the scroll 29 and from the scroll 29 is discharged through the delivery connection 30. The fluid, upon entering the impeller 45 is guided to the vanes 61 by the face 42 of the end portion 40 and the outer face 56 of the nut 55.

Access of fluid from the impeller casing 25 to the motor casing 9 is prevented by the separator plate 44 and also by the sealing ring 35 which prevents leakage from the casing 25. Any fluid passing to or around the bearing rings 46, by reason of their characteristics, will not have a deleterious effect. The surfaces of the impeller casing 25 and of the impeller 45 may be plated, if desired, with a plating coating which is resistant to the material being pumped.

If the pump is to be used submerged in liquid it is preferred that the space 12 be filled as previously pointed out.

If the pump is to be used for fluid mixing the fluid to be introduced will be induced through the pipe 65 and passageway 64 since the inner end of the passageway 64 is a low pressure area. The fluid can, of course, be introduced through the pipe 65 and passageway 64 under pressure. The quantity of fluid admitted through the pipe 65 may be regulated in any desired manner.

I claim:

1. In a motor driven pump, a stationary housing having an annular motor casing portion with a motor stator and winding therein, said motor stator having a transverse face disposed in a radial plane at one end thereof, said housing having an impeller casing portion in juxtaposed axial alignment with said motor casing portion, said housing having rim portions separable on a radial plane, said impeller casing portion having fluid inlet and fluid outlet connections, a separator plate extending radially and interposed between said casing portions and extending over said face, said motor casing portion having a hub fixedly carried thereby and extending through said separator plate and into said impeller casing section, an impeller in said housing rotatably supported by said hub, the rotor of the motor being mounted on one side of said impeller and spaced axially from and in facing relation to said face to form an axial fluid gap between said motor rotor and said separator plate, and said impeller on the other side thereof having fluid impelling members thereon for the delivery of fluid from said inlet connection to said outlet connection.

2. A motor driven pump as defined in claim 1 in which a bearing for the impeller is carried by said hub.

3. A motor driven pump as defined in claim 1 in which the hub has an end terminus with a removable impeller retaining member thereon.

4. A motor driven pump as defined in claim 1 in which a bearing for the impeller is carried by said hub and the hub has an end terminus with a removable impeller retaining and bearing engaging member thereon.

5. In a motor driven pump, a stationary housing having a motor casing section with a motor stator and winding therein, said motor stator having a transverse face disposed in a radial plane at one end thereof, said housing having an impeller casing section in juxtaposed axial alignment with said motor casing section, said housing having rim portions separable on a radial plane, said impeller casing section having fluid inlet and fluid outlet connections, said motor casing section having a hub fixedly carried thereby and extending into said impeller casing section, an impeller in said housing rotatably supported on the exterior of said hub, the rotor of the motor being mounted on one side of said impeller and spaced axially from and in facing relation to said face to form an axial fluid gap between said motor rotor and said motor stator, and said impeller on the other side thereof having fluid impelling members for the delivery of fluid from said inlet connection to said outlet connection.

6. A motor driven pump as defined in claim 5 in which a radial and axial thrust bearing member for the impeller is carried by said hub.

7. A motor driven pump as defined in claim 5 in which the hub has an end terminus with a removable impeller retaining member thereon.

8. In a motor driven pump, a stationary housing having a motor casing portion with a motor stator and winding therein, said motor stator having a transverse face disposed in a radial plane at one end thereof, said housing having an impeller casing portion in juxtaposed axial alignment with said motor casing portion, said housing having rim portions separable on a radial plane, said impeller casing portion having fluid inlet and outlet connections, said motor casing portion having a hub fixedly carried thereby and extending into said impeller casing portion, a separator plate disposed in a radial plane and interposed between said casing portions and through which said hub extends, an impeller in said impeller casing, self-lubricating bearing rings on said hub for rotatably mounting said impeller on said hub, radially extending thrust plate members on said hub with which the exterior radial faces of said bearing rings are in engagement, said impeller having the rotor of the motor mounted on one side thereof and in facing relation to said face, said motor rotor being spaced axially from said motor stator to provide an axial fluid gap between said motor rotor and said motor stator, and said impeller on the other side face thereof having fluid impelling members for the delivery of fluid from said inlet connection to said outlet connection.

9. In a motor driven pump, a stationary housing having a motor casing portion with a motor stator and winding therein, said motor stator having a transverse face disposed in a radial plane at one end thereof, said housing having an impeller casing portion in juxtaposed axial alignment with said motor casing portion, said housing having rim portions separable on a radial plane, said motor casing portion having a hub fixedly carried thereby and extending into said impeller casing portion, said impeller casing portion having fluid inlet and outlet connections, a separator plate of non-magnetic responsive material interposed in the radial separation plane between said rim portions and through which said hub extends, an impeller in said impeller casing portion, self-lubricating bearing rings on said hub for rotatably mounting said impeller on said hub, radially extending thrust plate members on said hub with which the exterior radial faces of said bearing rings are in engagement, a member on said hub in engagement with one of said plate members for holding said plate members and said impeller on said hub, said impeller having the rotor of the motor mounted on one side thereof and in facing relation to said face, said motor rotor being spaced axially from said motor stator to provide an axial fluid gap between said motor rotor and said motor stator, and said impeller on the other side face thereof having fluid impelling members for the delivery of fluid from said inlet connection to said delivery connection.

References Cited in the file of this patent

UNITED STATES PATENTS 592,244    Fay    Oct. 26, 1897

(Other references on following page)

UNITED STATES PATENTS

| | | | |
|---|---|---|---|
| 1,233,569 | Graemiger | July 17, | 1917 |
| 1,585,566 | Sindl | May 18, | 1926 |
| 1,705,263 | McIlvaine | Mar. 12, | 1929 |
| 2,245,577 | Dieckman | June 17, | 1941 |
| 2,278,397 | Scheibe et al. | Mar. 31, | 1942 |
| 2,429,114 | Whitted | Oct. 14, | 1947 |
| 2,438,629 | Anderson | Mar. 30, | 1948 |
| 2,481,172 | Staggs | Sept. 6, | 1949 |

FOREIGN PATENTS

| | | | |
|---|---|---|---|
| 192,618 | Great Britain | Feb. 8, | 1923 |
| 582,036 | Great Britain | Nov. 1, | 1946 |
| 594,849 | Great Britain | Nov. 20, | 1947 |